United States Patent [19]
Mott

[11] Patent Number: 4,993,999
[45] Date of Patent: Feb. 19, 1991

[54] CHAIN-BELT

[75] Inventor: Philip J. Mott, Dryden, N.Y.

[73] Assignee: Borg-Warner Automotive, Inc., Sterling Heights, Mich.

[21] Appl. No.: 496,461

[22] Filed: Mar. 20, 1990

[51] Int. Cl.⁵ .............................................. F16G 1/24
[52] U.S. Cl. ................................... 474/240; 474/242
[58] Field of Search .............. 474/201, 216, 237, 238, 474/240–242, 244–246, 248

[56] References Cited

U.S. PATENT DOCUMENTS

| | | | |
|---|---|---|---|
| 1,638,139 | 8/1927 | Belcher | 474/216 X |
| 2,038,583 | 4/1936 | Maurer | 474/245 X |
| 2,475,264 | 7/1979 | Sutton | 474/242 X |
| 3,720,113 | 7/1973 | Van Doorne et al. | 474/245 X |
| 3,949,621 | 4/1976 | Beusink et al. | 474/242 |
| 4,386,921 | 6/1983 | Roberts | 474/242 |
| 4,386,922 | 7/1983 | Ivey | 474/242 |
| 4,392,843 | 7/1983 | Smit | 474/245 |
| 4,464,152 | 8/1984 | Kern | 474/245 |
| 4,498,892 | 2/1985 | Huntley | 474/242 |
| 4,507,106 | 3/1985 | Cole, Jr. | 474/245 X |
| 4,512,754 | 4/1985 | Cole, Jr. et al. | 474/245 |
| 4,516,963 | 5/1985 | Mott | 474/245 |
| 4,516,964 | 5/1985 | Laster | 474/245 |
| 4,516,965 | 5/1985 | Mott | 474/245 |
| 4,526,559 | 7/1985 | Smirl | 474/242 X |
| 4,526,560 | 7/1985 | Swain | 474/242 |
| 4,545,779 | 10/1985 | Sakakibara et al. | 474/240 |
| 4,553,953 | 11/1985 | Bock | 474/242 X |
| 4,580,999 | 4/1986 | Ledford | 474/245 X |
| 4,581,000 | 4/1986 | Ferfecki | 474/242 |
| 4,622,025 | 11/1986 | Kern et al. | 474/245 |
| 4,645,479 | 2/1987 | Bateman et al. | 474/242 |
| 4,650,444 | 3/1987 | Sakakibara et al. | 474/201 |
| 4,650,445 | 3/1987 | Mott | 474/242 X |
| 4,655,732 | 4/1987 | Takashima | 474/201 |
| 4,692,130 | 9/1987 | Novak | 474/201 |
| 4,698,050 | 10/1987 | Hattori et al. | 474/242 |
| 4,708,701 | 11/1987 | Cole, Jr. | 474/245 |
| 4,718,880 | 1/1988 | Zimmer | 474/242 X |
| 4,737,137 | 4/1988 | Miyaishi | 474/245 |
| 4,738,654 | 4/1988 | Cole, Jr. | 474/219 |
| 4,776,829 | 10/1988 | Yamamuro et al. | 474/240 |

Primary Examiner—Thuy M. Bui
Attorney, Agent, or Firm—Emch, Schaffer, Schaub et al.; Greg Dziegielewski

[57] ABSTRACT

An endless power transmission chain-belt (13) especially adapted for drivingly connecting the pulleys (2 and 3) of a pulley transmission (1) having a chain (10, 12). The chain (10, 12) is an assembly of plurality of interleaved sets of links (16, 18, 20, 22). A pivot means (24) extends through the chain (10, 12) to lace and pivotally interconnect adjacent sets of links (16, 18, 20, 22) to provide an endless chain-belt (13). The sets of links (16, 18, 20, 22) of the chain (10, 12) are held together by the pivot means (24). A plurality of load blocks (14) are connected to the chain-belt (13). The load blocks (14) have at least one projection (15) that extends in a direction towards chain (10, 12). The projection (15) engages adjacent pivot means (24) to secure the load blocks (14) to the chain (10, 24). The load blocks (14) extend substantially across the width of the chain (10, 12). Each load block (14) has lateral edges (26, 28) that are shaped to frictionally engage the pulleys (2 and 3) of a pulley transmission (1).

23 Claims, 6 Drawing Sheets

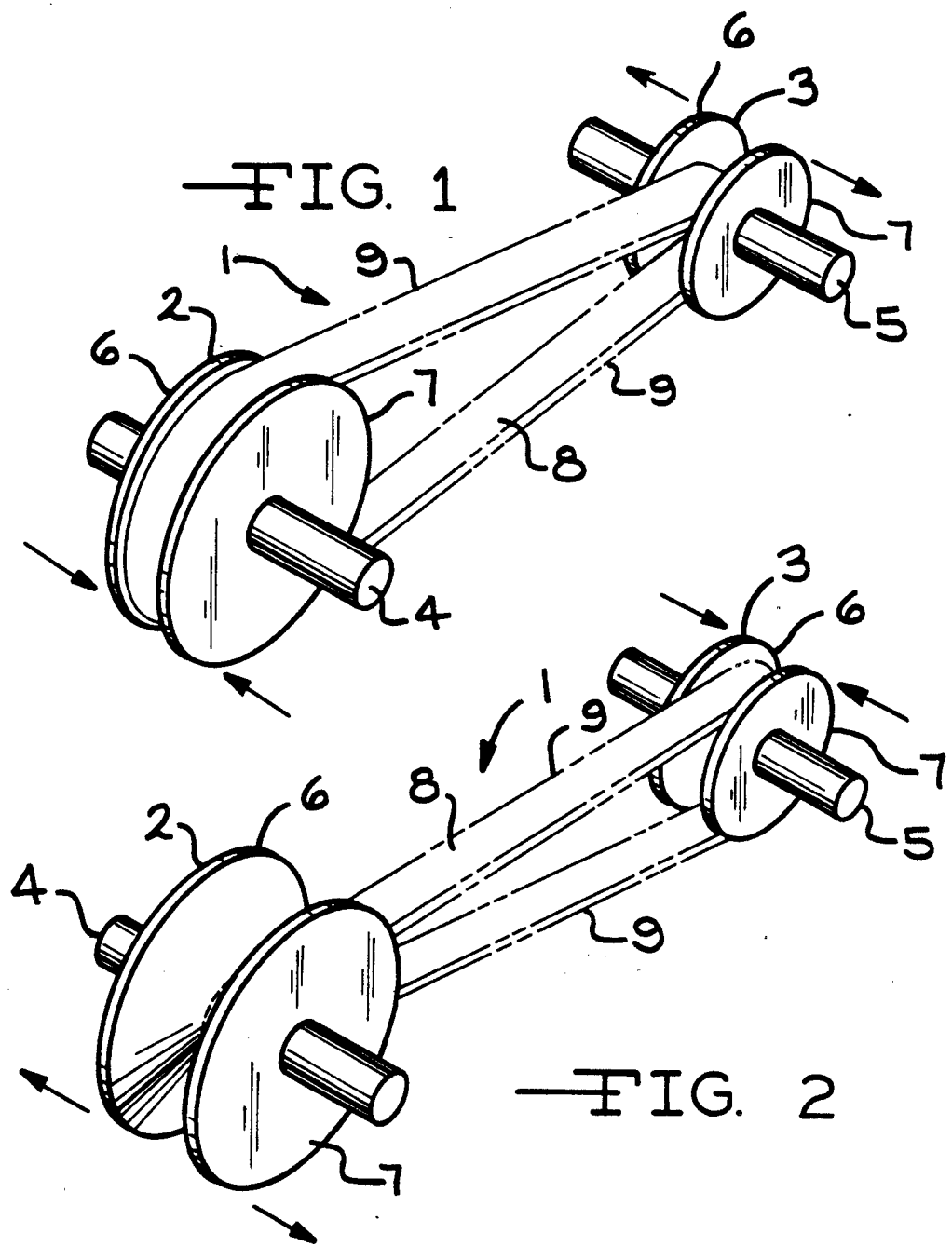

CHAIN-BELT

TECHNICAL FIELD

This invention relates to metal chain-belts especially adapted to connect the pulleys of a pulley transmission, particularly a continuously variable transmission (CVT), and broadly comprises a tension member or carrier constructed of a plurality of interlaced links arranged in transverse sets with the adjacent sets joined by pivot means, and load blocks carried by the carrier for engaging the pulleys.

BACKGROUND ART

Flexible power transmission means-comprising an assembly of a plurality of superimposed steel strips and a plurality of V-shaped blocks of metal are known in the art. An example of such construction is disclosed in U.S. Pat. No. 3,720,113 granted Mar. 13, 1973 to H. J. Van Doorne et al. In the patented structure, the blocks are provided with lateral guides having top edges which overlie the steel strips to maintain the parts in assembled relationship. The load is carried by the blocks and the blocks can slide along the band.

Another example of a flexible power transmission means is described in U.S. Pat. No. 3,949,621 granted Apr. 13, 1976 to Beusink, deceased, et al. in which metal plates are mounted on metal strips, the strips being received in slots in one of the lateral edges of the plates.

Other flexible power transmission means comprising an assembly of links, pins and pulley contact members are described in U.S. Pat. Nos. 2,038,583, granted Apr. 28, 1936 to Maurer and 2,475,264, granted July 5, 1949 to Sutton.

Another metal transmission belt is shown in U.S. Pat. No. 4,645,479. In this reference there are a pair of spaced generally parallel chains that are each constructed of a plurality of sets of interleaved links. Each set is joined to the next adjacent set by a pin and the pin extends across both chains. Generally trapezodial load blocks are located between the chains and have cut outs in the sides for locating the chains. The load blocks are generally contoured at their edges to fit into the V of the pully and are disposed between the chains. The load is carried by the chains and its pins. The load blocks are longitudinally positioned with respect to the chains by the chain pins.

DISCLOSURE OF THE INVENTION

According to the invention to be described herein, a flexible power transmission means comprising a chain that is an assembly of a plurality of interleaved sets of links. The sets of links are joined together by a pivot means which permits articulation of the sets of links to form an endless chain belt. Generally trapezoidal, load blocks are located between the pins. Each load block has at least one projection that extends towards said chain and engages adjacent pivot means to secure the load blocks to the chains. The load blocks have a load carrying section that extends substantially across the width of the chains.

BRIEF DESCRIPTION OF THE DRAWINGS

FIG. 1 is a schematic view of a continuously variable transmission (CVT).

FIG. 2 is a schematic view of a continuously variable transmission.

BEST MODE FOR CARRYING OUT THE INVENTION

Figure 3:
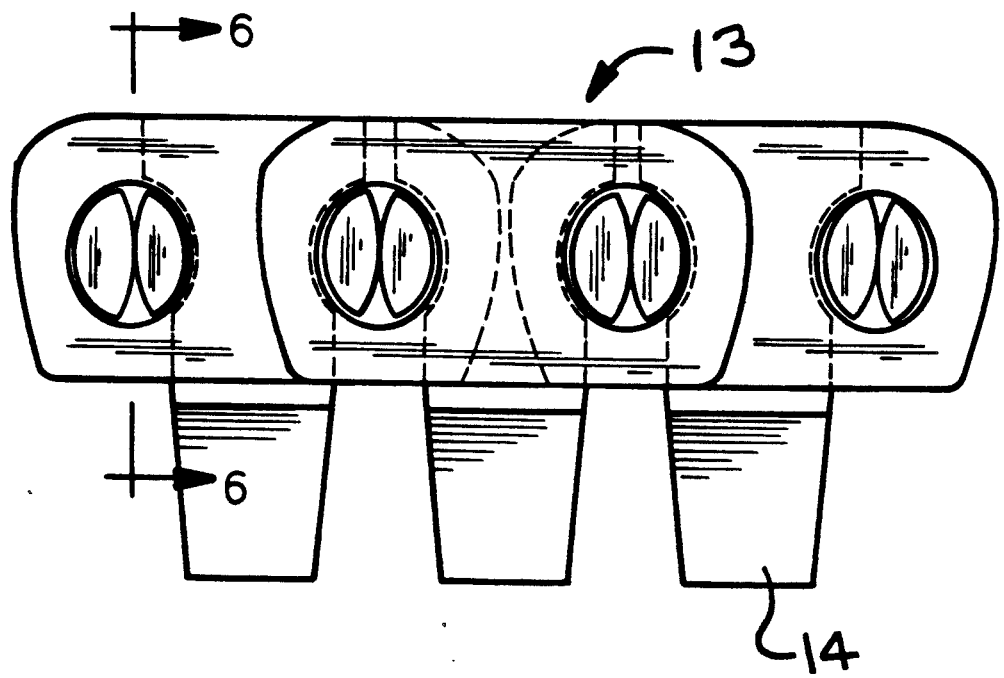
FIG. 3 is a side elevation view of the invention.
Figure 4:
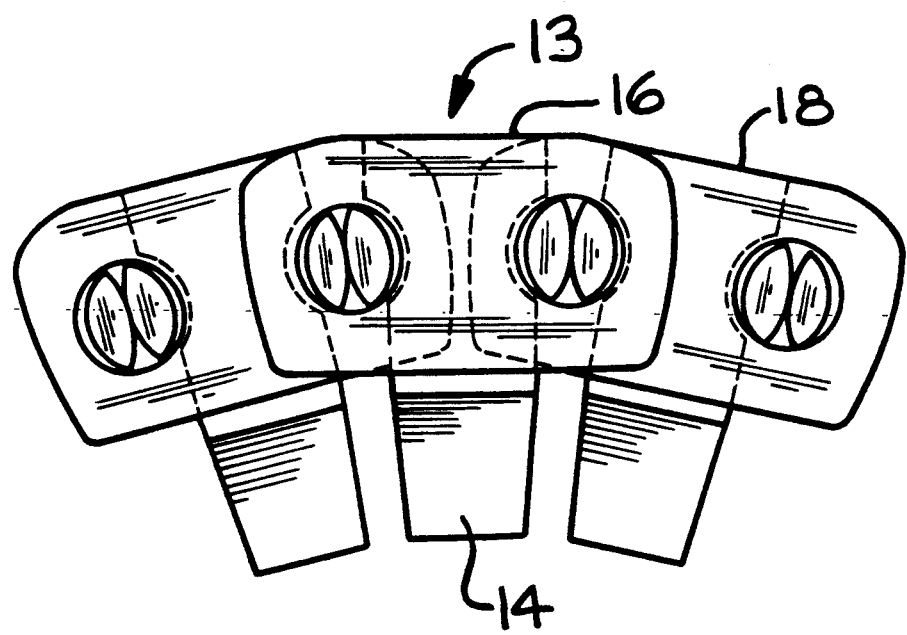
FIG. 4 is a side elevation view.
Figure 5:
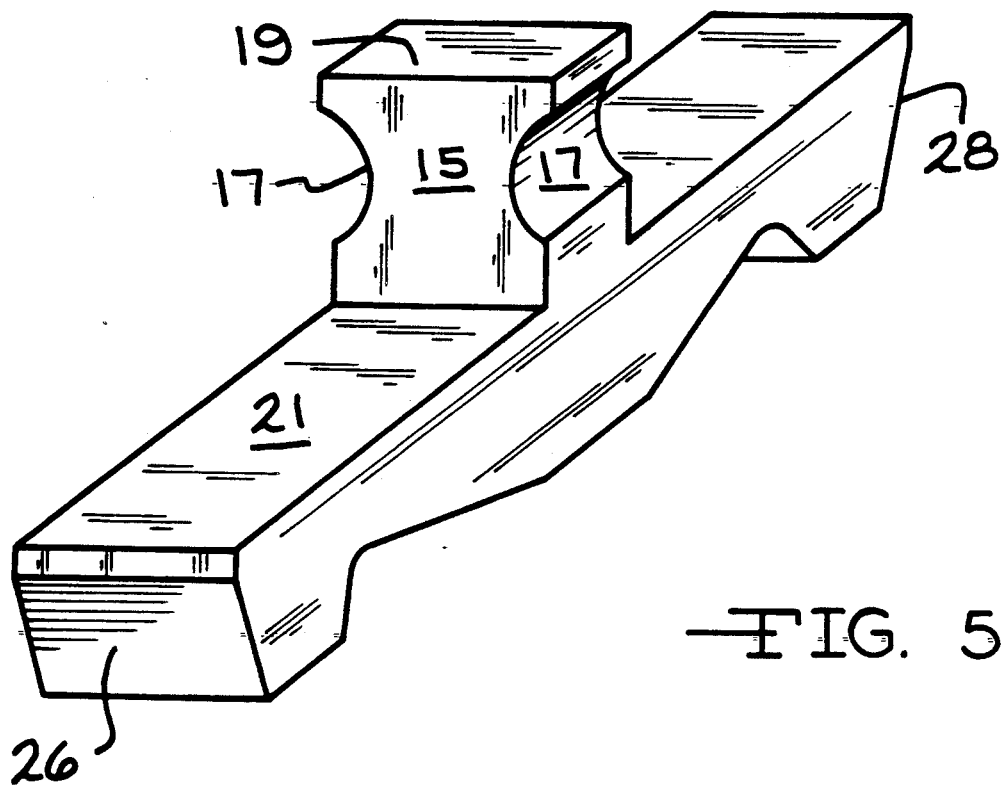
FIG. 5 is a perspective view of a load block of the invention.
Figure 6:
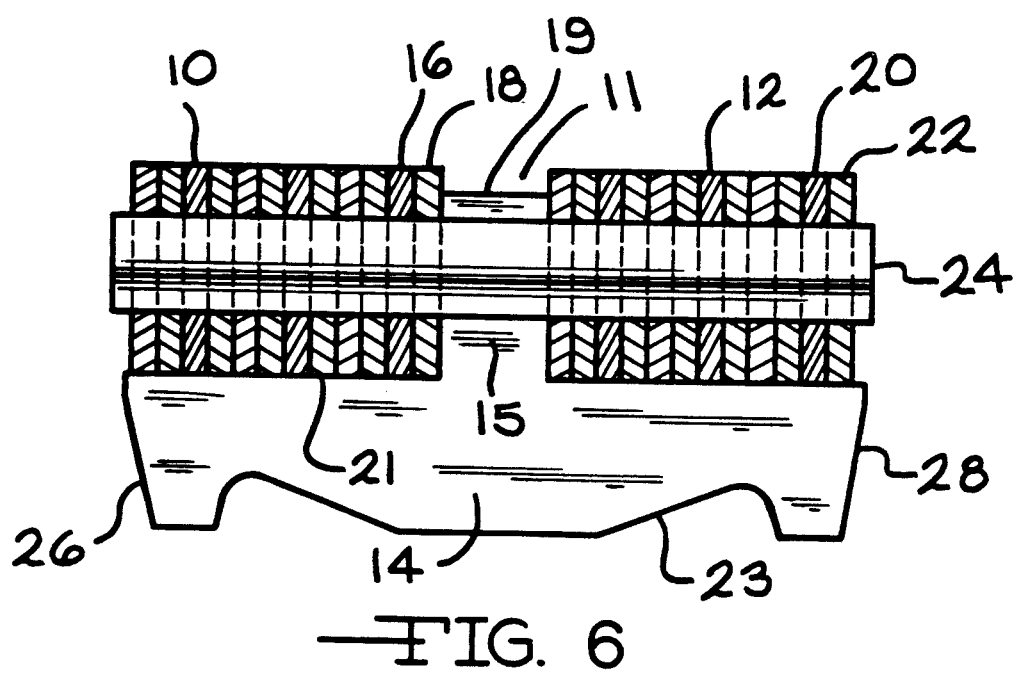
FIG. 6 is a cross-sectional view taken along line 6—6 of FIG. 3.

FIGS. 1 and 2 illustrate schematically a continuously variable transmission (CVT) 1 in two drive ratios. The CVT comprises a pair of pulleys 2 and 3 connected respectively to shafts 4 and 5. One of the shafts being the driven shaft and the other shaft being the drive shaft. Pulleys 2 and 3 comprise a pair of flanges 6 and 7 with at least one of the flanges being conical. The pulleys are connected by a belt 8 and the side edges 9 of the belt frictionally engage the pulley flanges. At least one flange of each pulley is axially moveable with respect to the other so as to vary the drive ratios between the pulleys. The arrows indicate the axial movement of the flanges to effect different drive ratios. Means beyond the scope of this invention can be provided for axially moving a least one flange relative to the other.

The power transmission means of this invention comprises a pair of spaced chains 10, 12 and a plurality of generally trapezoidal load blocks 14 that form an endless chain belt 13. Each chain 10 and 12 comprises sets of interleaved links 16, 18 and 20, 22, respectively, which are joined by pins 24. The load blocks 14 have tapered sides 26, 28 that are disposed to engage the flanges of a pulley. Each load block 14 is located between the next adjacent pins 24. The load blocks 14 have a projection 15 that extends from the load block into the space 11 between the spaced chains 10 and 12. The projection 15 engages the pins 24 that join the interleaved links together. The projection has grooves 17 positioned on opposite sides of the projection. The grooves 17 are disposed for receiving the pins 24 and the grooves have a shape that does not restrict rotational movement of the pins. The grooves allow the chains 10 and 12 to articulate around the pins 24 during use of the chain. The end of the projection 15 that is spaced apart from bottom of the load block terminates in a flange 19 that extends at least partially over adjacent pins 24. The positioning of the pins 24 in grooves 17 of the projection 15 and flange 19 act to secure the load block to the chain-belt 13. The surface of the load blocks 14 from which the projection 15 extends, has a substantially flat surface 21. The surface 21 is positioned to be in contact with one side of the links that form chains 10 and 12. The side 23 of the load blocks 14 that is spaced apart from the chains 10 and 12 can be contoured to remove metal from portions of the load block where the metal is not needed for strength purposes to reduce the weight of the load block. Thus the load blocks 14 are longitudinally positioned by the chains' pins 24, and the load is carried by the pins and the chains. The load blocks 14 may be described as being generally T-shaped.

The tapered sides 26, 28 of each load block 14 may be roughened to enhance the frictional contact with the flanges 6, 7, respectively of a pulley. In actual use, the assembly connects spaced pulleys to provide a drive therebetween, the pulleys may be of a variable nature so that the drive ratio therebetween is variable, as is known in the art.

The pulley contacting portion of the load blocks is positioned on one side of the chains 10 and 12 and this allows the chains 10 and 12 to be substantially as wide as the load blocks. This allows as many links as possible to be used to form chains 10 and 12 which improves the tensile strength of the chains. The projection 15 is also relatively thin so that not many links are lost in the space required for the projection. In practice it has been found that approximately 40% more links can be used in the chain of the present invention when compared to prior art type chains with load blocks.

The solid monolithic load blocks are also very strong and very effective in handling the forces encountered in contacting the flanges 6 and 7 of the pulley. In operation the load blocks 14 are forced against the chains 10 and 12 so that surface 21 bears against the links of the chains. This spreads the forces from contacting the flanges to be spread over the surface 21 of the load blocks and also over the links of the chains 10 and 12. This reduces the load that must be carried by the projection 15 on the load blocks and the pins 24 that secure together the links of the chains 10 and 12. This allows the projection to be relatively small in size as the basic role of the projection is to hold the load blocks 14 in position adjacent the chains 10 and 12 and to assist in removing the load blocks 14 from the pulleys. Accordingly, the chains 10 and 12 can be as large as possible to increase the tensile strength of the chains.

The load blocks 14 may be constructed of steel or other suitable material and the chain links are generally stamped from sheet metal ribbon stock and the pins are generally die formed metal stock. The opposite ends of the pins can be upset to retain the assembly of links, or in a preferred embodiment, the outside links of the chains are press-fit on the pins during the assembly of the links and load blocks while the inner links are slip-fit on the pins.

Figure 7:
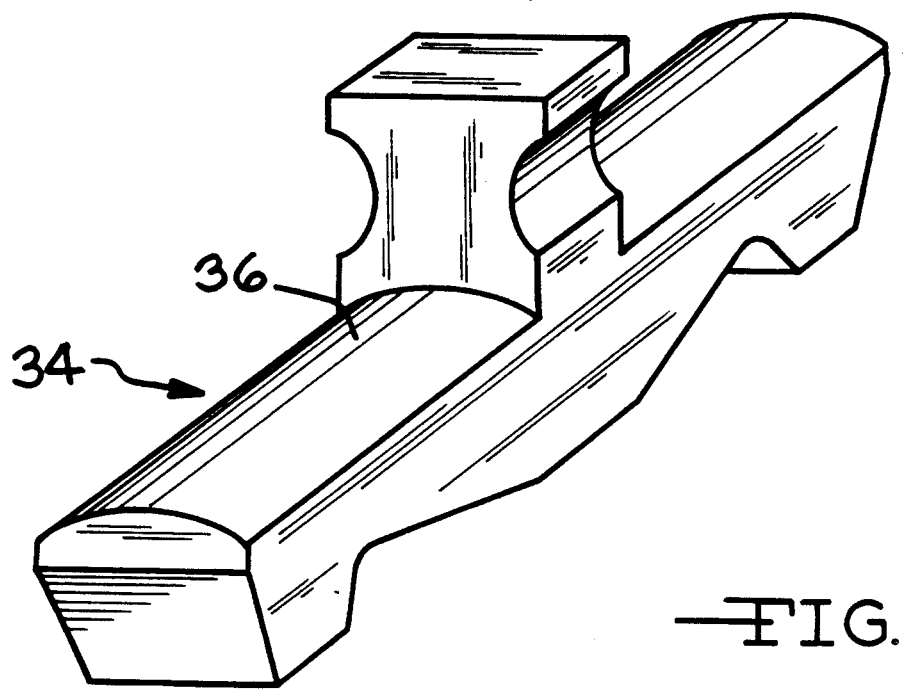
FIG. 7 is a perspective view of another embodiment of a load block of the invention.
Figure 8:
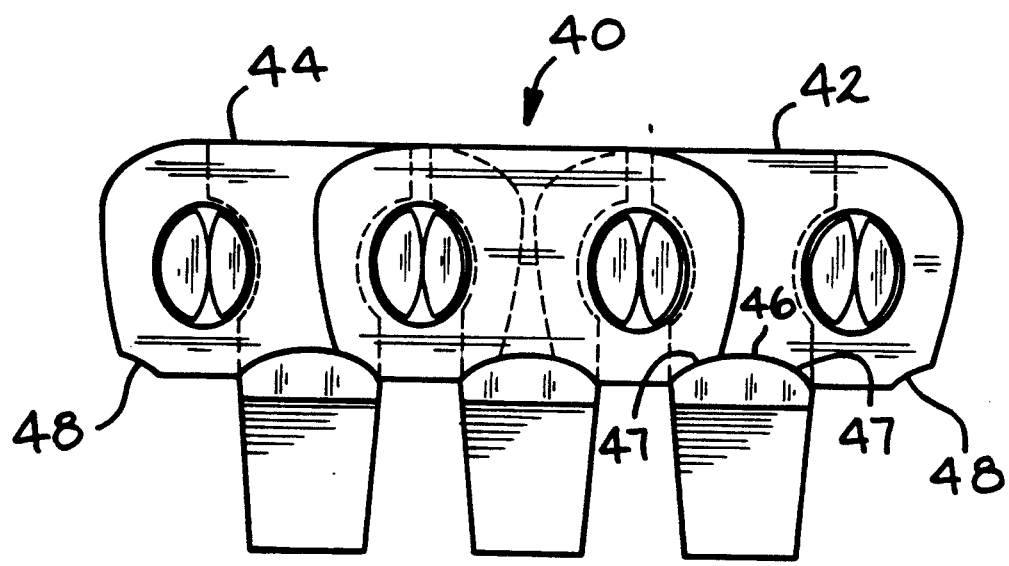
FIG. 8 is a side elevation view of another embodiment of the invention using the load block of FIG. 7.

FIGS. 7 and 8 shown another embodiment of the present invention. In this embodiment the load block 34 has a curved upper surface 36 that is in contact with the interleaved links of the two spaced chains as previously described. In FIG. 8 only one of the spaced chains 40 is shown and this chain has interleaved links 42, 44. The links 42 have a groove 46 that is positioned to receive the curved upper surface 36 of the load block 34. The groove 46 is substantially the same shape and size as the curved upper surface 36 of the load blocks 34. The links 44 of the chain 40 have a curved notch 48 on each end of the links. The curved notches 48 are disposed to receive the curved upper surface 36 of the load blocks 34. It should be understood that the other spaced chain is constructed in the same manner as that described for chain 40. Also the chain-belt shown in this embodiment functions in the same manner as the previously described chain-belt.

The flanges of the pulleys of the CVT 1 place essentially two types of loads on the load blocks 34. The primary load or force on the load blocks is in a radial direction that is generally perpendicular to the direction of travel of the chains. The radial force acts to push the load blocks 34 in a direction into the groove 46 of the links. There is also a smaller force acting on the load blocks 34 that is substantially in the tangential direction or same direction as the direction of travel of the spaced chains. The resultant force vector that results from the combination of the large radial force and the smaller tangential force always acts between points of contact 47 in the groove 46 of the links 42 as shown in FIG. 8. The groove 46 is also constructed so that the groove contacts each side of the load blocks 34 at points of contact 47. These points of contact on each side of the load blocks 34 act to stabilize the load blocks and acts to substantially eliminate rotation of the load blocks during use of the chain-belt 13. The contact areas in the groove 46 of the links 42 at points of contact 47 are at the outer limit of the resultant force vector that acts on the load blocks. Accordingly, the load blocks 34 are always contacted on each side by the contact area of the groove 46 and this substantially eliminates any tendency of the load blocks 34 to rotate.

Figure 9:
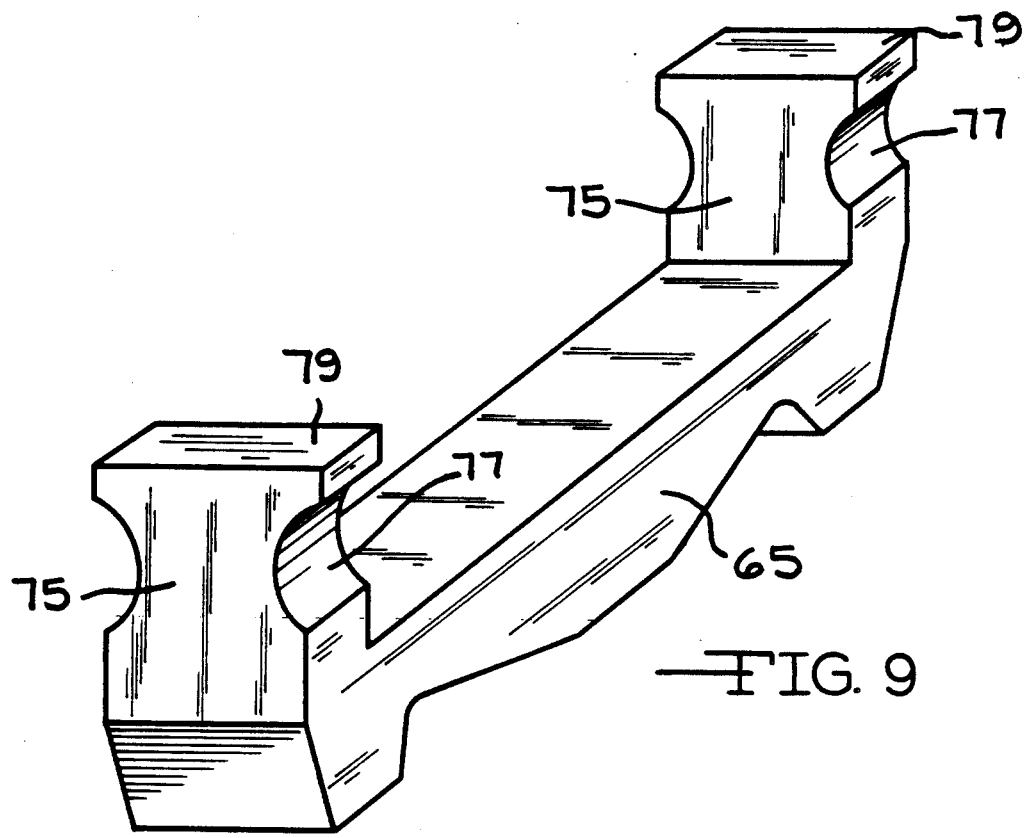
FIG. 9 is a perspective view of another embodiment for a load block of the present invention.
Figure 10:
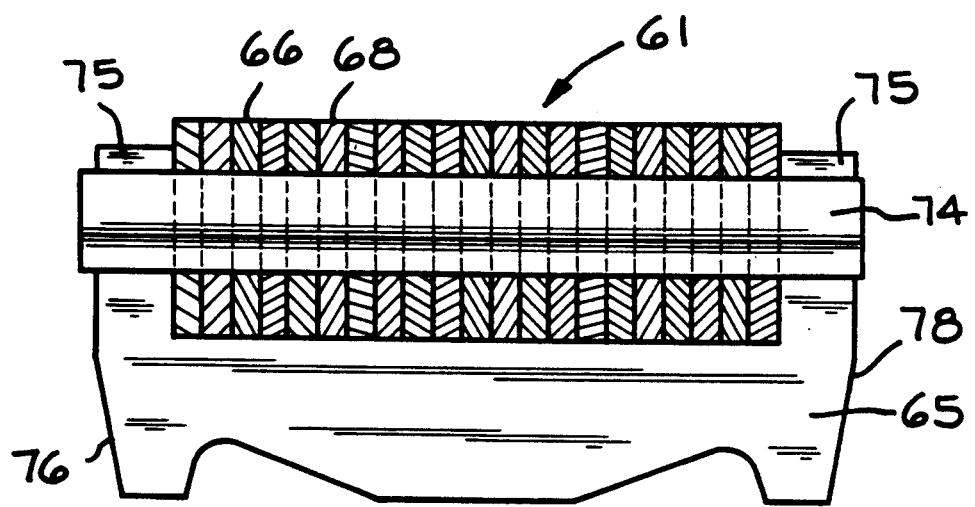
FIG. 10 is a cross-sectional view of a chain-belt utilizing the load block of FIG. 9.
Figure 11:
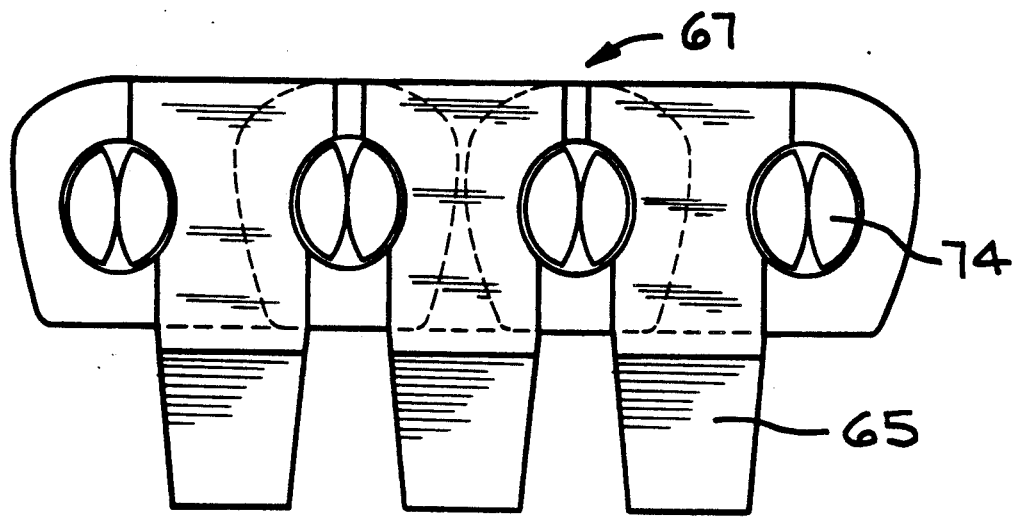
FIG. 11 is a side elevation view of the chain-belt of FIG. 10.

FIGS. 9-11 show another embodiment of the present invention that utilizes a single chain 61 and a plurality of generally trapezodial load blocks 65 to form an endless chain-belt 67. The chain 61 is formed of sets of interleaved links 66, 68 respectively, which are pivotally joined together by pins 74. The load blocks 65 have tapered sides 76, 78 that are disposed to engage the flanges of a pulley. Each load block is located between the next adjacent pins 74. The load blocks 65 have a projection 75 that extends from each end of the load block and between the adjacent pins 74. The projections 75 engages the pins 74 that join the interleaved links together. The projections 75 have grooves 77 that are positioned on opposite sides of the projections. The grooves 77 are disposed for receiving the pins 74 and the grooves have a shape that does not restrict rotational movement of the pins. The grooves 77 allow the chain 61 to articulate around the pins 74 during use of the chain. The ends of the projections 75 that are spaced from the bottom of the load block terminates in a flange 79 that extends at least partially over adjacent pins 74. The positioning of the pins 74 in the grooves 77 of the projections 75 and the flanges 79 act to secure the load blocks 65 to the chain 61. The chain-belt 67 of this embodiment functions in the same basic manner as the previously described chain-belt 13. One advantage of this embodiment is that the projections 75 are located on the outside edge of the chain 61 and the projections can act to retain the links 66, 68 in their position in the chain 61. This allows guide links or other devices that are normally used to hold the chain together to be eliminated.

Figure 12:
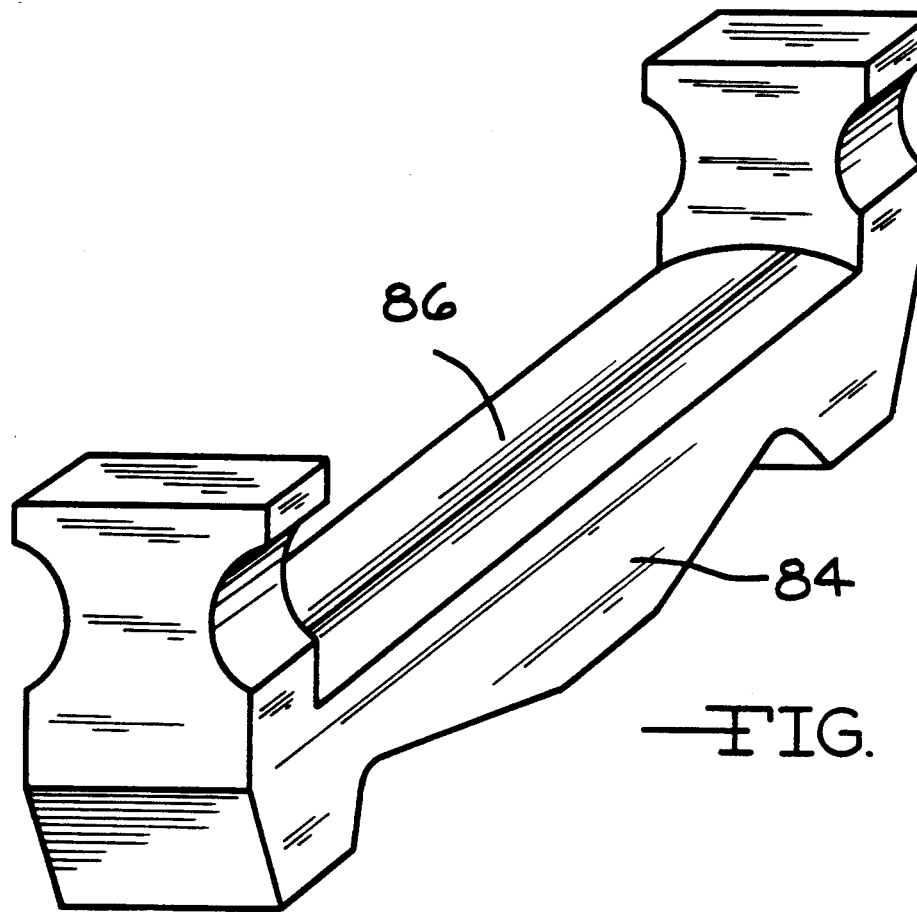
FIG. 12 is a perspective view of another embodiment for a load block of the present invention.

FIG. 12 shows another embodiment of the load block generally shown in FIGS. 9-11. In this embodiment the load blocks 84 have a curved upper surface 86 that is in contact with the interleaved links. This is the only difference over the load block 65 shown in FIGS. 9-11. The load block 84 interacts with the links of a carrier chain in the same manner as the load blocks 34 shown in FIGS. 7 and 8. Because of these similarities to the previously described chain-belts the additional features of this embodiment will not be repeated to reduce unnecessary duplication.

The above description is given for the sake of explanation. Various modifications and substitutions, other than those cited, can be made without departing from the scope of the following claims.

I claim:

1. An endless power transmission chain-belt (13) especially adapted for drivingly connecting the pulleys (2, 3) of a pulley of a pulley transmission (1) comprising:
   a chain (10, 12), said chain (10, 12) being an assembly of a plurality of interleaved sets of links (16, 18, 20, 22);
   a pivot means (24) extending through said chain (10, 12) to lace and pivotally interconnect adjacent sets of links (16, 18, 20, 22) to provide an endless chain-belt (13), said sets of links (16, 18, 20, 22) of said chain (10, 12) being held together by said pivot means (24);
   a plurality of load blocks (14) connected to said chain-belt (13), said load blocks (14) having at least one projection (15) that extends in a direction towards chain (10, 12), said projection (15) engaging adjacent pivot means (24) to secure said load blocks (14) to said chain (10, 12), said load blocks (14) extending substantially across the width of said chain (10, 12), each load block (14) having lateral edges (26, 28) shaped to frictionally engage said pulleys (2, 3) of said pulley transmission (1) said load blocks (14) being in contact with said links (16, 18, 20, 22) whereby said forces on said load blocks (14) from said pulleys (2, 3) of said pulley transmission (1) are spread across said load blocks (14) and said links (16, 18, 20, 22) of said chain (10, 12).

2. The chain-belt (13) of claim 1, wherein said projection (15) on said load blocks (14) has substantially arcurate grooves (17) for engaging said adjacent pivot means (24).

3. The chain-belt (13) of claim 2, wherein said projection (15) terminates in a flange (19) that extends over the adjacent pivot means (24).

4. The chain-belt (13) of claim 3, wherein said load blocks (14) are a one piece construction.

5. The chain-belt (13) of claim 1, wherein said load blocks (14) have a substantially flat surface (21) that is positioned adjacent a substantially flat surface defined by said sets of links (16, 18, 20, 22) to spread the load on said load blocks (14) over the width of said chain (10, 12).

6. The chain-belt (13) of claim 1, wherein said links have a groove (46) that is positioned to receive a curve upper surface (36) of said load blocks.

7. The chain-belt (13) of claim 6, wherein said groove (46) has points of contact (47) on each side of said load blocks (14), said points of contact (47) engaging said load blocks (14) and acting to stabilize and substantially eliminate rotation of said load blocks (14) during use of said chain-belt.

8. The chain-belt (13) of claim 1, wherein said chain is comprised of a first and second chain (10, 12) and said first and second chains (10, 12) are disposed in substantially parallel spaced apart relationship.

9. The chain-belt (13) of claim 8, wherein said projection (15) extends between said first and second chains (10, 12).

10. The chain-belt (13) of claim 1, wherein a projection (75) is located on each end of said load blocks (14) and engages said adjacent pivot means (24) to secure said load blocks (14) to said chain (10, 12).

11. An endless power transmission chain-belt (13) especially adapted for drivingly connecting the pulleys (2, 3) of a pulley transmission (1) comprising:
    a first and second chain (10, 12), each chain (10, 12) being an assembly of a plurality of interleaved sets of links (16, 18, 20, 22), said first and second chains (10, 12) being in substantially parallel spaced apart relationship;
    a pivot means (24) extending through said first and second chains (10, 12) to lace and pivotally interconnect adjacent sets of links (16, 18, 20, 22) to provide an endless chain-belt (13), said sets of links (16, 18, 20, 22) of said spaced apart first and second chains (10, 12) being held together by said pivot means (24);
    a plurality of load block (14) connected to said chain-belt (13), said load blocks (14) having a projection (15) that extends between said first and second chains (10, 12), said projection (15) engaging adjacent pivot means (24) to secure said load blocks (14) to said first and second chains (10, 12), said load blocks (14) extending substantially across the width of said first and second chains (10, 12), each load block (14) having lateral edges (26, 28) shaped to frictionally engage said pulleys (2, 3) of said pulley transmission (1), said load blocks (14) being in contact with said links (16, 18, 20, 22) whereby said forces on said load blocks from said pulleys (2, 3) of said pulley transmission (1) are spread across said load blocks (14) and said links (16, 18, 20, 22) of said first and second chain (10, 12).

12. The chain-belt (13) of claim 11, wherein said projection (15) on said load blocks (14) has substantially arcuate grooves (17) for engaging said adjacent pivot means (24).

13. The chain-belt (13) of claim 12, wherein said projection (15) terminates in a flange (19) that extends over the adjacent pivot means (24).

14. The chain-belt (13) of claim 13, wherein said load blocks (14) are a one piece construction.

15. The chain-belt (13) of claim 11, wherein said load blocks (14) have a substantially flat surface (21) that is positioned adjacent a substantially flat surface defined by said sets of links (16, 18, 20, 22) to spread the load on said load blocks (14) over the width of said first and second chains (10, 12).

16. The chain-belt (13) of claim 11, wherein said links have a groove (46) that is positioned to receive a curved upper surface (36) of said load blocks.

17. The chain-belt (13) of claim 16, wherein said groove (46) has points of contact (47) on each side of said load blocks (14), said points of contact (47) engaging said load blocks (14) and acting to stabilize and substantially eliminate rotation of said load blocks (14) during use of said chain-belt.

18. An endless power transmission chain-belt (67) especially adapted for drivingly connecting the pulleys (2, 3) of a pulley transmission (1) comprising:
    a chain (61), said chain (61) being an assembly of a plurality of interleaved sets of links (66, 68);
    a pivot means (74) extending through said chain (61) to lace and pivotally interconnect adjacent sets of links (66, 68) to provide an endless chain-belt (67), said sets of links (66, 68) of said chain (61) being held together by said pivot means (74);
    a plurality of load blocks (65) connected to said chain-belt (67), said load blocks (65) having a projection (75) located on each end of said load blocks (65), said projections (75) engaging adjacent pivot means (74) to secure said load blocks (65) to said chain (61), said load blocks (65) extending substantially across the width of said chain (61), each load block (65) having lateral edges (26, 28) shaped to frictionally engage said pulleys (2, 3) of said pulley transmission (1), said load blocks (65) being in contact with said links (66, 68) whereby said forces on said load blocks (65) from said pulleys (2, 3) of said pulley transmission (1) are spread across said load blocks (65) and said links (66, 68) of said chain (61).

19. The chain-belt (67) of claim 18, wherein said projections (75) on said load blocks (65) have substantially arcuate grooves (77) for engaging said adjacent pivot means (74).

20. The chain-belt (67) of claim 19, wherein said projections (75) terminate in a flange (79) that extends over the adjacent pivot means (74).

21. The chain-belt (67) of claim 20, wherein said load blocks (65) are a one piece construction.

22. The chain-belt (67) of claim 18, wherein said links (66, 68) have a groove (46) that is positioned to receive a curved upper surface (86) of said load blocks.

23. The chain-belt (67) of claim 22, wherein said groove (46) has points of contact (47) on each side of said load blocks (65), said points of contact (47) engaging said load blocks (65) and acting to stabilize and substantially eliminate rotation of said load blocks (65) during use of said chain-belt (67).

* * * * *